(12) United States Patent
Nave et al.

(10) Patent No.: US 7,843,663 B2
(45) Date of Patent: Nov. 30, 2010

(54) RETAINING GATE FOR DEEP STORAGE SLOT RETENTION OF STORAGE CARTRIDGES

(75) Inventors: Shawn M. Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 11/674,904

(22) Filed: Feb. 14, 2007

(65) Prior Publication Data
US 2008/0231988 A1  Sep. 25, 2008

(51) Int. Cl.
*G11B 15/675* (2006.01)
(52) U.S. Cl. .................................... 360/92.1
(58) Field of Classification Search ............ 360/92, 360/92.1, 98.06; 369/30.49
See application file for complete search history.

(56) References Cited

U.S. PATENT DOCUMENTS

| 4,024,354 | A | * | 5/1977 | Bolick et al. ............ 360/69 |
| 4,240,120 | A | * | 12/1980 | Padwa .................. 360/15 |
| 6,781,789 | B2 | | 8/2004 | Ostwald |
| 7,477,478 | B2 | | 1/2009 | Nave et al. |
| 7,505,224 | B2 | | 3/2009 | Chamorro et al. |
| 2007/0230036 | A1 | * | 10/2007 | Nave et al. ............ 360/92 |
| 2008/0231988 | A1 | * | 9/2008 | Nave et al. ........... 360/92.1 |

OTHER PUBLICATIONS

U.S. Patent Application entitled "Cartridge Retention in an Automated Data Storage Library", U.S. Appl. No. 11/373,963, filed Mar. 13, 2006 by inventor S. Nave.

* cited by examiner

*Primary Examiner*—Jefferson Evans
(74) *Attorney, Agent, or Firm*—Rabindranath Dutta; Konrad Raynes & Victor LLP

(57) ABSTRACT

A storage cartridge retention device employs a deep storage slot for storing one or more storage cartridge(s) through its front opening and biases the stored storage cartridge(s) in a direction of its front opening. The storage cartridge retention device further employs a retaining gate external to the deep storage slot and movable relative to the front opening of the deep storage slot between a retaining position and a releasing position. The retaining position engages a front storage cartridge to retain the storage cartridge(s) within the deep storage slot based on the bias of the storage cartridge(s) in the direction of the front opening of the deep storage slot, and the releasing position disengages the front storage cartridge to facilitate movement of the one storage cartridge(s) within the deep storage slot based on the bias of the storage cartridge(s) in the direction of the front opening of the deep storage slot.

16 Claims, 11 Drawing Sheets

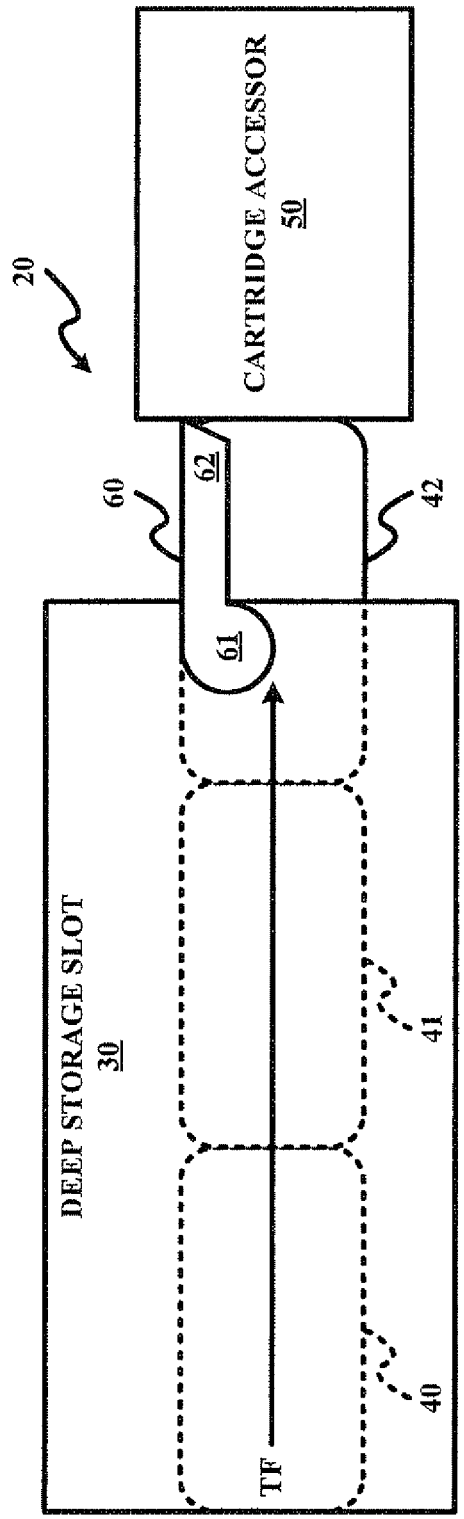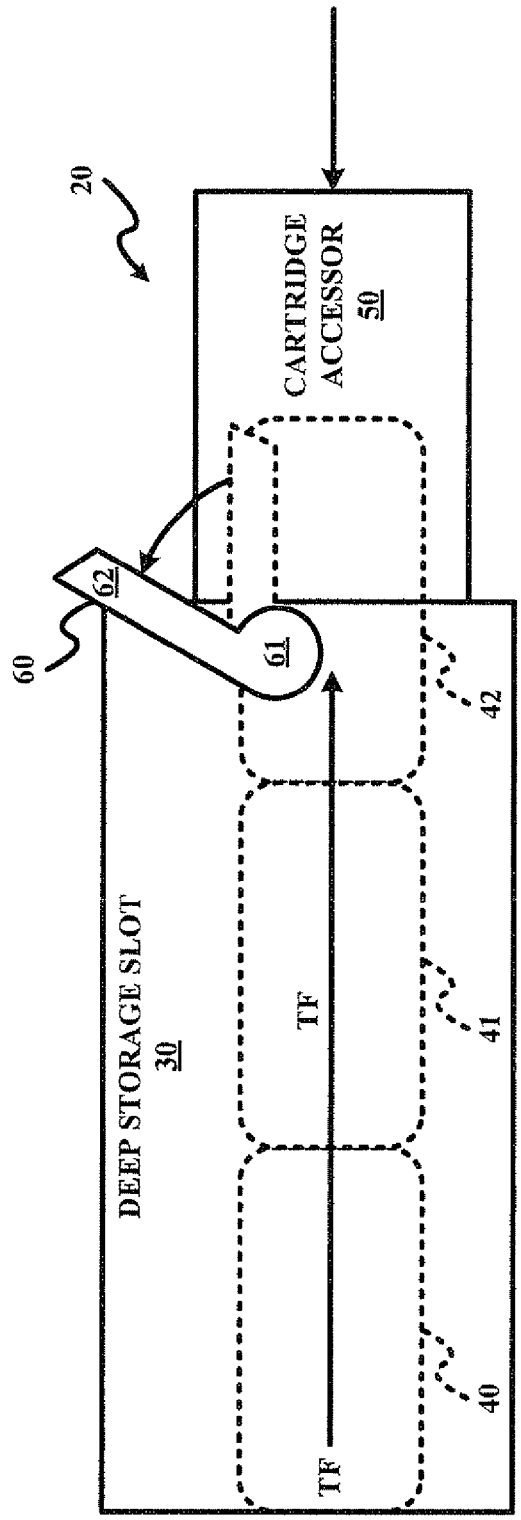

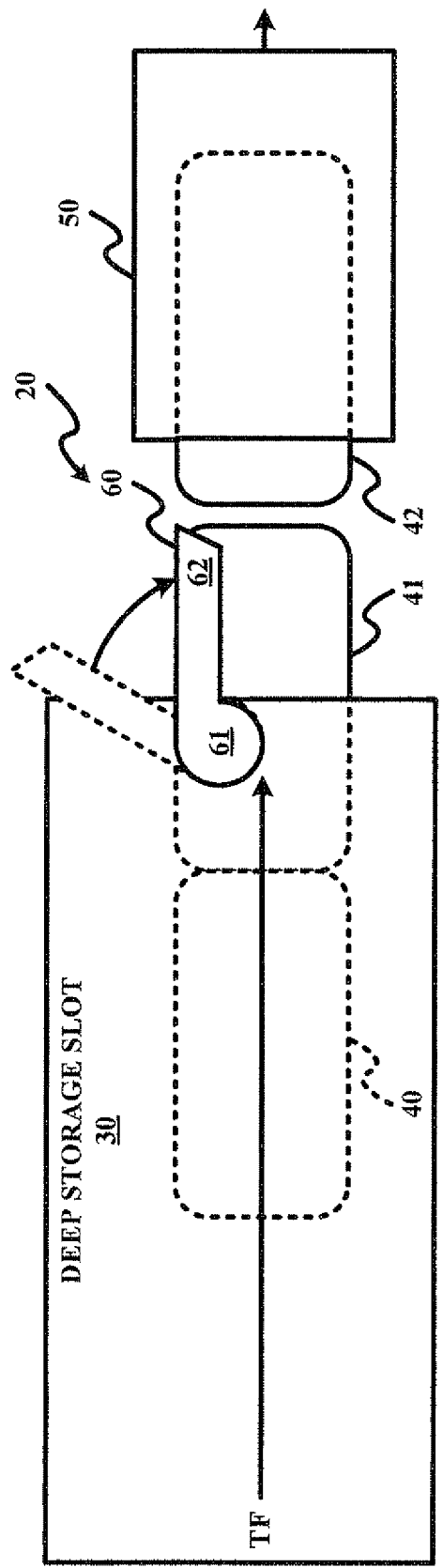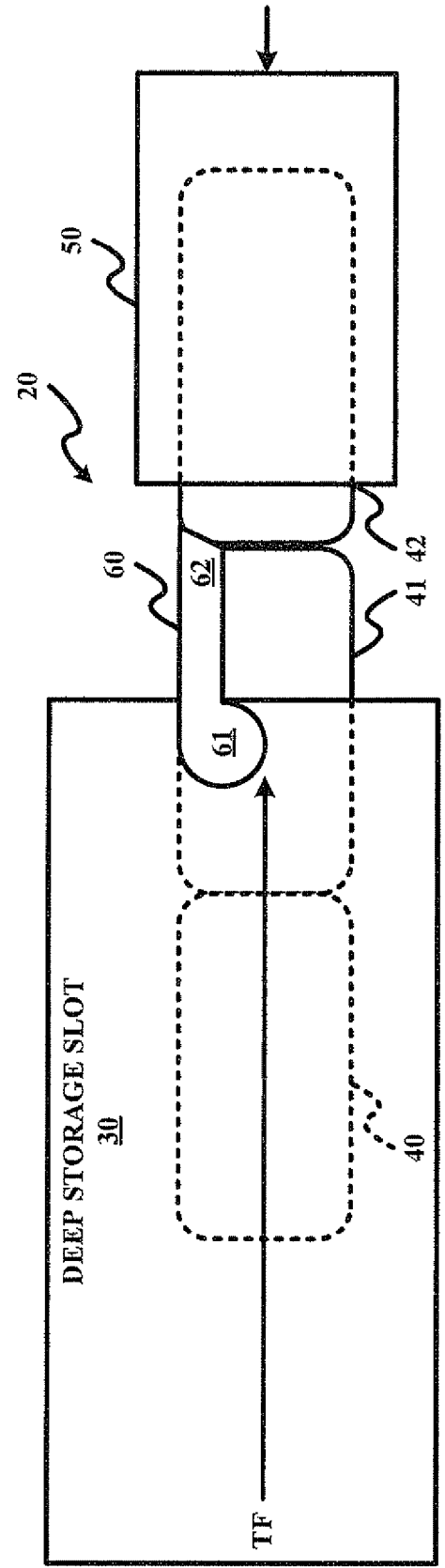

RETAINING GATE FOR DEEP STORAGE SLOT RETENTION OF STORAGE CARTRIDGES

FIELD OF THE INVENTION

The present invention generally relates to a retention of storage cartridges within a deep storage slot (e.g., retention of multiple tape cartridges within a storage slot capable of holding the tape storage cartridges in a sequential alignment). The present invention specifically relates to a retaining gate for retaining storage cartridges within a deep storage slot during an insertion by a cartridge accessor of a front storage cartridge into the deep storage slot or a retrieval by a cartridge accessor of a front storage cartridge from the deep storage slot.

BACKGROUND OF THE INVENTION

A method for increasing storage density and capacity in automated tape libraries is to stack tape cartridges in depth, one behind the other. The slots that hold these tape cartridges can be described as deep storage slots that allow for more than one tape cartridge to be stored in depth. Deep storage slots require a pushing mechanism to push a tape cartridge to the front opening of the deep storage slot as a front tape cartridge in order to position the front tape cartridge where a library robotic accessor can pick the front tape cartridge for placement into a tape drive or another library slot. An issue to be addressed for retaining tape cartridges in a deep storage slot is to ensure the push of the front tape cartridge to the front of the deep storage slot does not push the front tape cartridge out of the deep storage slot and onto the library floor. This is particularly relevant to pushing mechanisms that have a continuous force pushing the tape cartridge(s) toward the deep storage slot opening, such as, for example, by a spring or by gravity.

A widely used known solution for cartridge retention in tape libraries is to have a snap that engages in a notch on a side of a single tape cartridge within a tape slot. This snap is usually an integral part of the plastic slot material and snaps into a retention recess in a particular tape cartridge. This method of retention is an adequate solution for retaining a single tape cartridge, but is deficient when deep storage slots with multiple cartridges are used. The reason is that the retention snap must provide enough retention force to prevent the tape cartridge(s) from being pushed out of the slot by the continuous force mechanism. For the deep storage slot to function properly, when the front tape cartridge in a deep storage slot is removed the remaining tape cartridge(s) in the deep storage slot must be pushed forward to the slot opening. If the retention snap can prevent a single tape cartridge from being pushed out of the cell, then this snap also provides enough force to prevent the other tape cartridge(s) from moving past the snap at all toward the slot opening. In other words, the retention snap defeats the pushing mechanism for allowing the tape cartridge(s) to be positioned at the front of the deep storage slot for cartridge access.

Another known solution uses internal retaining hooks to retain tape cartridges in a deep storage slot with a continuous force pushing the tape cartridges out of the cell. A problem that has been seen with this solution is that when the retaining hooks have a flexible force that is movable by a cartridge accessor, this force becomes very light and the continuous force that moves the tape cartridges can overcome these retaining hooks, and push the tape cartridges through the hooks out of the slot. In order for this to work effectively the strength of the retaining hooks must be significantly high. In order for the cartridge accessor to push these hooks open, it must be very robust and have significant power that is cost prohibitive. A further complication with this solution is that when a tape cartridge is being removed from the deep storage slot by the cartridge accessor, the continuous force pushes the tape cartridges to the front on the deep storage slot simultaneously. Because these tape cartridges are being pushed together, there is little to no space between the tape cartridges in order for the retention hooks to engage the second cartridge reliably.

SUMMARY OF THE INVENTION

The present invention provides a new and unique retaining gate for deep storage slot retention of storage cartridges.

A first form of the present invention is a storage cartridge retention device comprising a deep storage slot and a retaining gate external to the deep storage slot. In operation, the deep storage slot stores one or more storage cartridge(s) through its front opening and biases the stored storage cartridge(s) in a direction of its front opening. The retaining gate is movable relative to the front opening of the deep storage slot between a retaining position and a releasing position. The retaining position engages a front storage cartridge to retain the storage cartridge(s) within the deep storage slot based on the bias of the storage cartridge(s) in the direction of the front opening of the deep storage slot, and the releasing position disengages the front storage cartridge to facilitate movement of the one storage cartridge(s) within the deep storage slot based on the bias of the storage cartridge(s) in the direction of the front opening of the deep storage slot.

A second form of the present invention is the storage cartridge retention device further comprising a cartridge accessor. In operation, the cartridge accessor controls a movement of the retaining gate between the retaining position and the releasing position based on a storage operation between the cartridge accessor and the front cartridge (i.e., a removal by the cartridge accessor of the front tape cartridge from the deep storage slot or an insertion by the cartridge accessor of the front tape cartridge into the deep storage slot).

The aforementioned forms and additional forms as well as objects and advantages of the present invention will become further apparent from the following detailed description of the various embodiments of the present invention read in conjunction with the accompanying drawings. The detailed description of the drawings are merely illustrative of the present invention rather than limiting, the scope of the present invention being defined by the appended claims and equivalents thereof.

BRIEF DESCRIPTION OF THE DRAWINGS

FIGS. 1-4 illustrate an operation of one embodiment of a retaining gate in accordance with the present invention;

DETAILED DESCRIPTION OF THE PRESENT INVENTION

Figure 5:
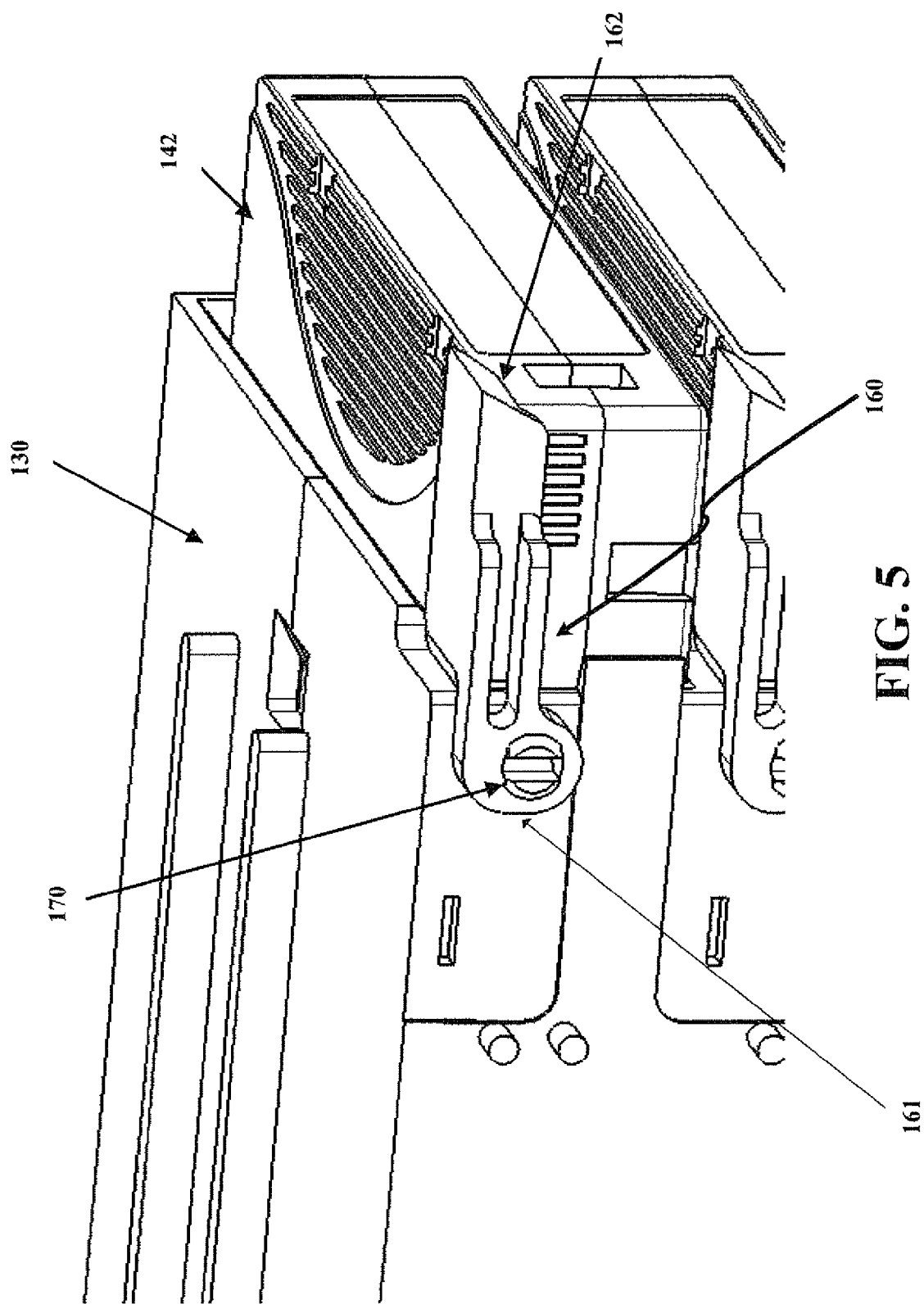
FIGS. 5 and 6 illustrate opposing perspective views of a retaining position of a first exemplary embodiment of the retaining gate illustrated in FIGS. 1-4 in accordance with the present invention.

The present invention is premised on providing a retention gate that is externally attached to a deep storage slot relative to a front opening of the deep storage slot whereby the retaining gate can be activated by a cartridge accessor of an automated tape library. The retaining gate allows for positive cartridge retention, and ensures that one or more storage cartridges do not get pushed out of the deep storage slot simultaneously while allowing the pushing mechanism of the deep storage slot to always push the storage cartridge(s) to the opening in a deep storage slot.

The basic working of the retaining gate is that the gate prevents the storage cartridge(s) from being pushed out of a deep storage slot. For example, as shown in FIGS. 1-4, a retaining gate 60 can be lifted by a cartridge accessor 50 or by a front cartridge 42 for cartridge removal from/insertion into a deep storage slot 30. Specifically, retaining gate 60 has a pivoting arm 61 mounted on deep storage slot 30 via a pivoting post (not shown) that can be integral to a construction of deep storage slot 30. Pivoting arm 61 is located below a catch 62 of retaining gate 60 whereby a thrust force TF through storage cartridge 40-42 by the pushing mechanism (not shown) of deep storage slot 30 causes retaining gate 60 to stay closed in a retaining position as shown in FIG. 1. Retaining gate 60 is biased such that it closes in the downward direction over the front opening of deep storage slot 30. This constant biasing can be done by gravity as shown in FIG. 1 or by a spring force attached to retaining gate 60 (not shown).

For removal of front tape cartridge 42 by cartridge accessor 50 from deep storage slot 30, retaining gate 60 must be lifted upward to a releasing position whereby catch 62 of retaining gate 60 is disengaged from front storage cartridge 42. This can be seen in FIG. 2 where cartridge accessor 50 interfaces with retaining gate 60 by providing a lifting force. Once retaining gate 60 is lifted to the releasing position and cartridge accessor 50 is engaged with storage cartridge 42, cartridge accessor 50 can pull storage cartridge 42 out of deep storage slot 30 and into cartridge accessor 50 without any interference of retaining gate 60 as shown in FIG. 3. In view of storage cartridges 40 and 41 being stored in deep storage slot 30, retaining gate 60 must return to its retaining position to prevent storage cartridges 40 and 41 from being ejected from deep storage slot 30 by the pushing mechanism. During extraction of front tape cartridge 42 through the front opening of deep storage slot 30, retaining gate 60 which is being biased downward moves back to the retaining position to engage storage cartridge 41.

Once front tape cartridge 42 is extracted and storage cartridges 41 and 40 are retained from being pushed out of deep storage slot 30, retaining gate 60 has successfully completed its cartridge retrieval process. Now retaining gate 60 must demonstrate an ability to work for cartridge insertion into deep storage slot 30. When cartridge accessor 50 begins to insert storage cartridge 42 back into deep storage slot 30, retaining gate 60 must be lifted to its releasing position in order to allow storage cartridge 42 through the front opening of deep storage slot 30. Catch 62 of retaining gate 60 interfaces with a rear portion of storage cartridge 42, in particular a beveled surface of catch 62 as shown in FIG. 4, whereby retaining gate 60 is lifted to its releasing position as shown in FIG. 2 due to storage cartridge 42 being pushed in deep storage slot 30 by cartridge accessor 50. In doing this operation, storage cartridges 40 and 41 are pushed deeper into deep storage slot 30 by storage cartridge 42 in deep storage slot 30 by cartridge accessor 50. Upon full insertion into deep storage slot 30, retaining gate 50 moves to its retaining position to engage storage cartridge 42 as shown in FIG. 1.

In practice, the present invention does not impose any limitations or any restrictions to a structural configuration of a retaining gate of the present invention other than an external coupling of the retaining gate relative to a front opening of a deep storage slot whereby the retaining gate can be moved between a retaining position and a releasing position in any manner (e.g., a pivoting motion, a lateral motion, and/or a rotation motion). To further facilitate an understanding of the present invention, exemplary embodiments of a retaining gate of the present invention as incorporated with LTO tape cartridges will now be described herein.

Figure 6:
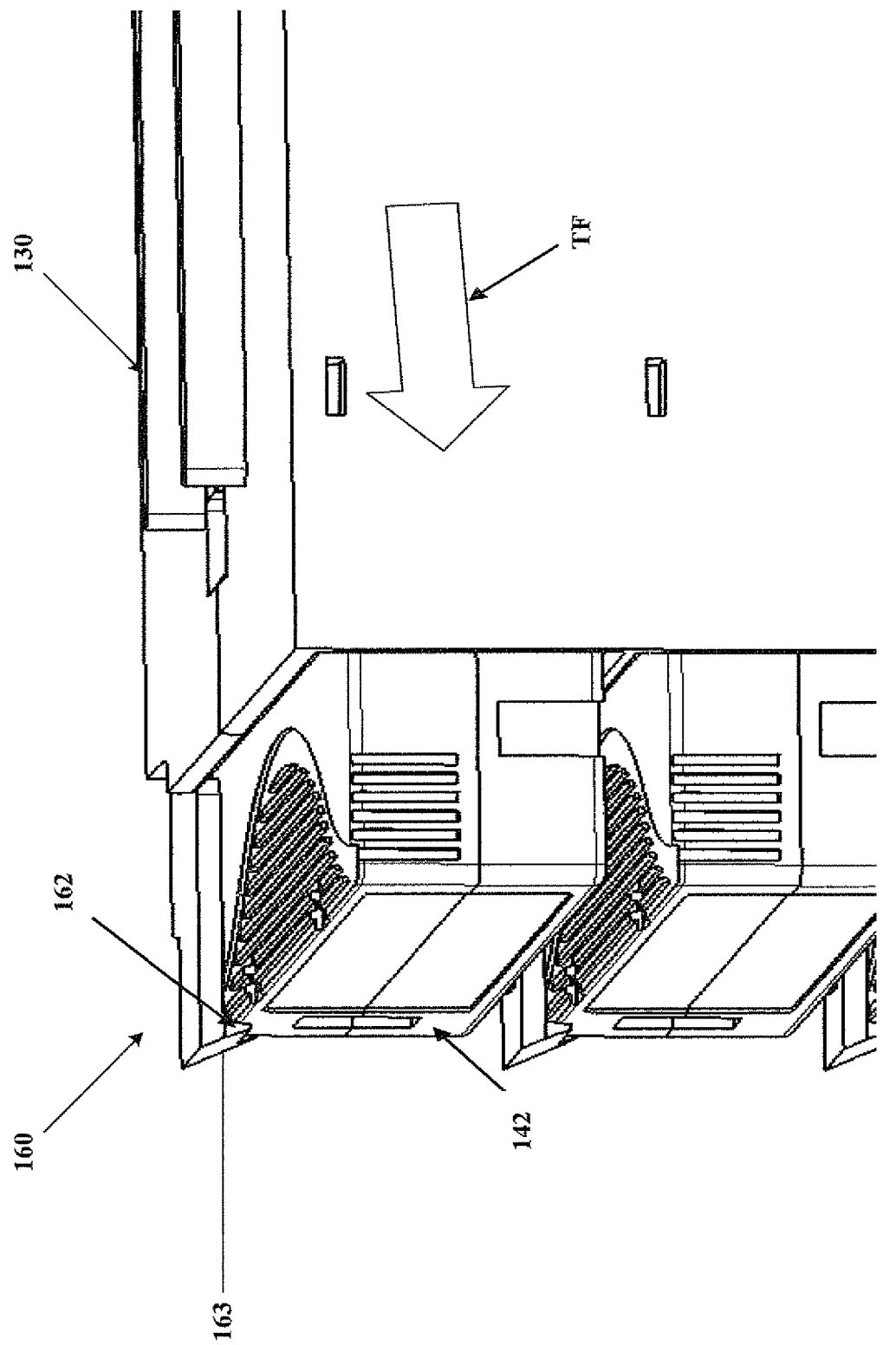
Figure 7:
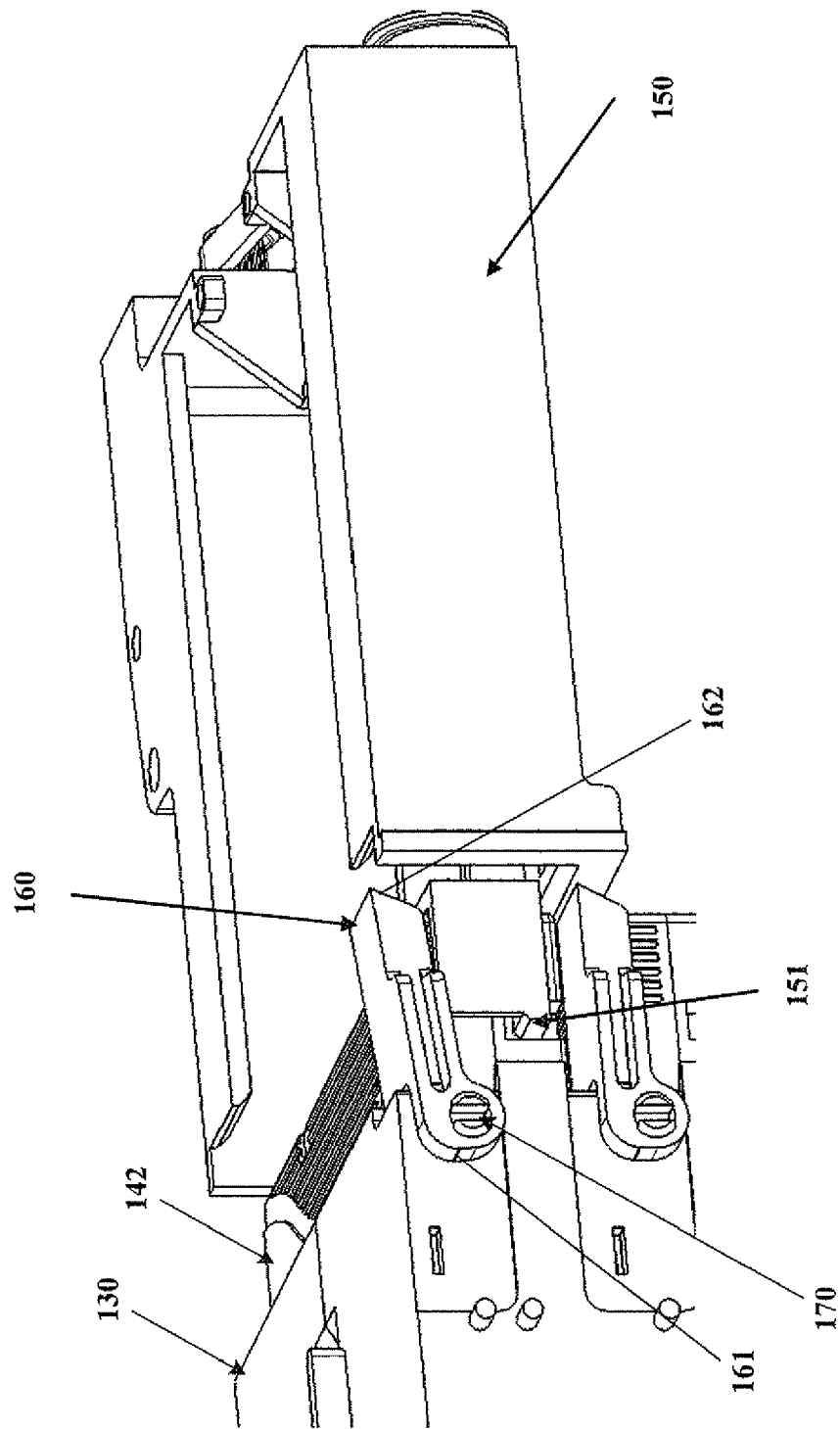
FIGS. 7-10 illustrate perspective views of an operation of the retaining gate illustrated in FIGS. 5 and 6 during a removal by a cartridge accessor of a front tape cartridge through the front opening of a deep storage slot in accordance with the present invention.

FIGS. 5 and 6 illustrate a retaining gate 160. The basic working of retaining gate 160 is that retaining gate 160 prevents LTO tape cartridges stored therein from being pushed out of a deep storage slot 130. Retaining gate 160 is then lifted by tape cartridge accessor 150 (FIG. 7) or by tape cartridge 142 itself for cartridge removal or insertion, respectively. A pivot arm 161 of retaining gate 160 is mounted on a pivot post 170 that can be integral to a construction of deep storage slot 130. A catch 162 of retaining gate 160 is mounted above the plane of pivot post 170 with catch 162 having a beveled area 163 whereby a thrust force TF through tape cartridge 142 by the pushing mechanism (not shown) of deep storage slot 130 causes retaining gate 160 to stay in a retaining position. Retaining gate 160 is constantly biased such that it closes to its retaining position over the leading edge of tape cartridge 142. This constant biasing can be done by gravity as shown in FIGS. 5 and 6, or by a spring force attached to retaining gate 160 (not shown).

Figure 8:
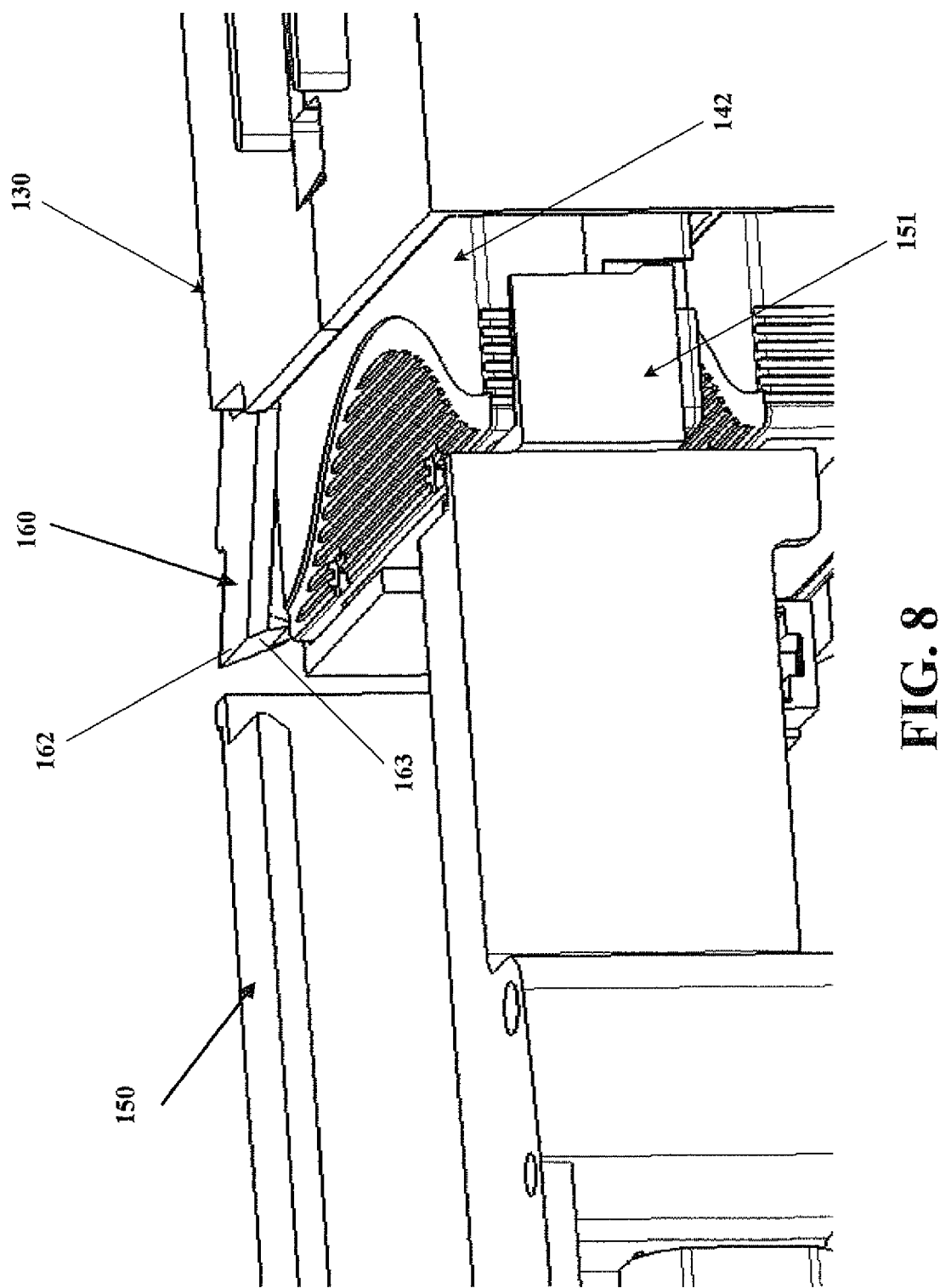
Figure 9:
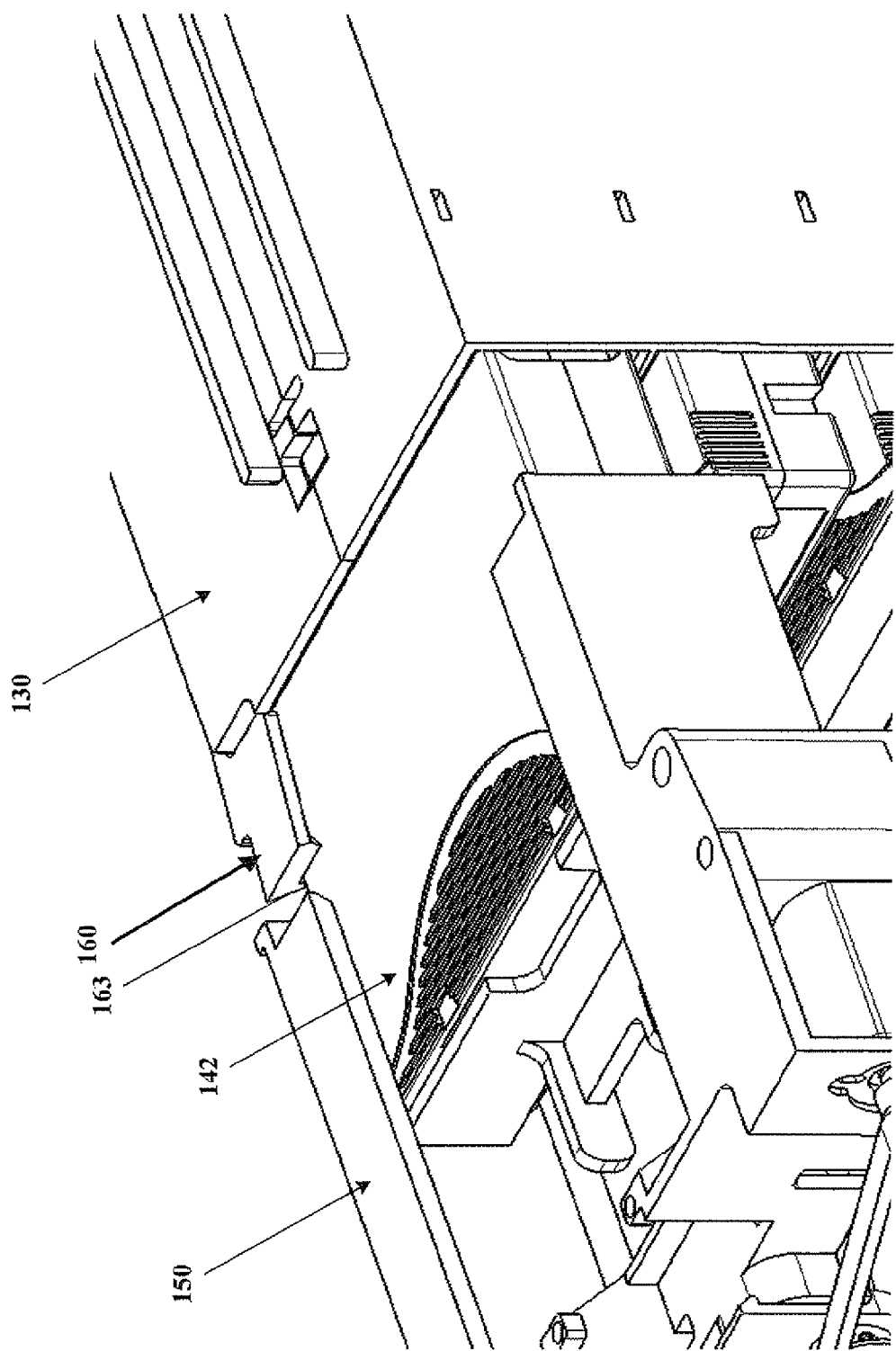

For removal of tape cartridge 142 by cartridge accessor 150 from deep storage slot 130, retaining gate 160 must be lifted to its releasing position so that catch 162 of retaining gate 160 is disengaged from tape cartridge 142. This can be seen in FIGS. 7 and 8 where fingers 151 of cartridge accessor 150 interacts with retaining gate 160 by providing a lifting force. Once retaining gate 160 is lifted to its releasing position and fingers 151 of cartridge accessor 150 are engaged with the appropriate notches in tape cartridge 142, cartridge accessor 150 can pull tape cartridge 142 out of deep storage slot 130 and into cartridge accessor 150 without any interference of retaining gate 160. Retaining gate 160 closing force causes retaining gate 160 to rest on the top of tape cartridge 142 while tape cartridge 142 is pulled out of deep storage slot 130 as shown in FIG. 9.

Figure 10:
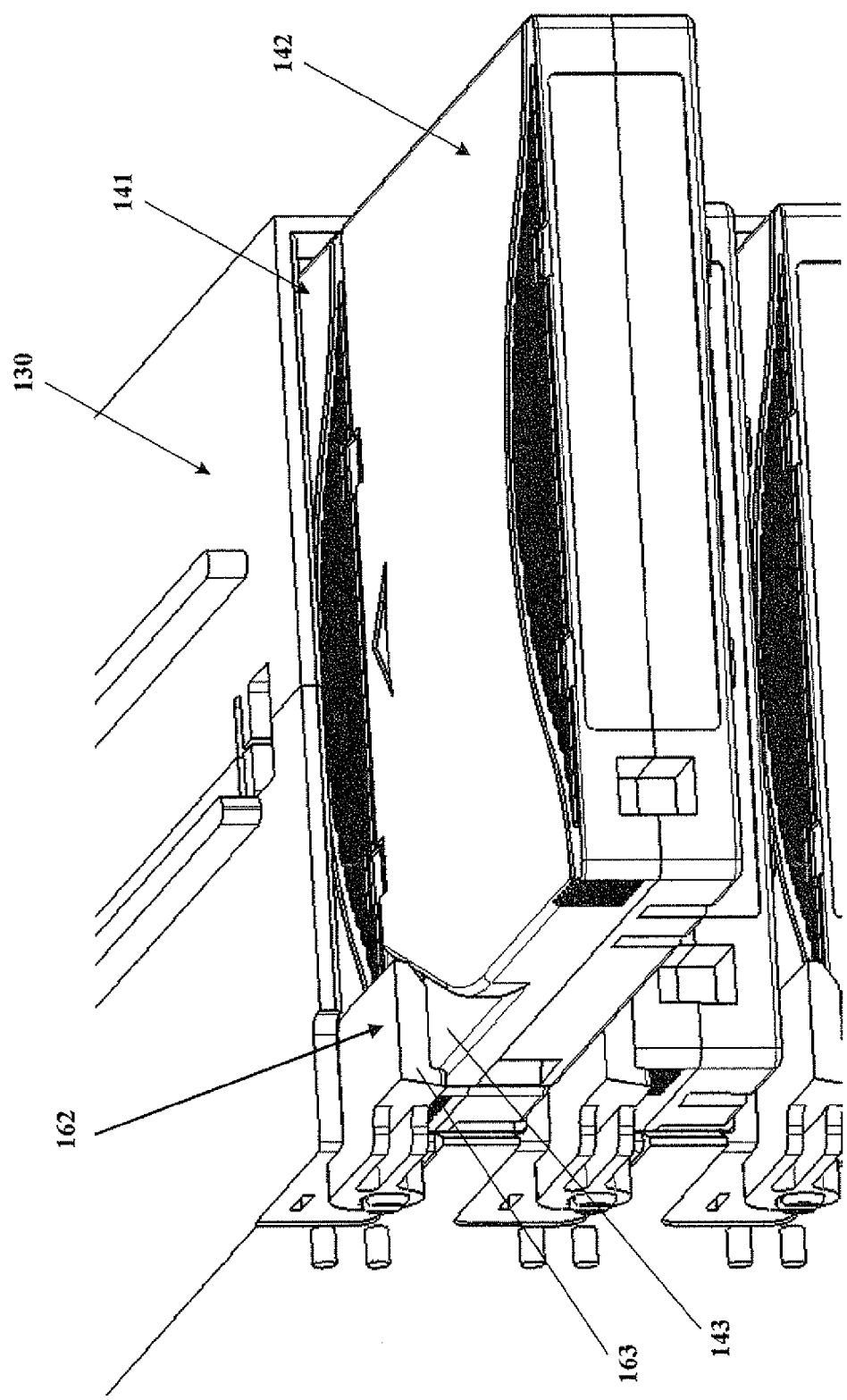

When multiple tape cartridges are stored in deep storage slot 130, retaining gate 160 must return to its retaining position to prevent tape cartridge 141 as shown in FIG. 10 from being ejected from deep storage slot 130 by its pushing mechanism. Retaining gate 160 takes advantage of a large notch in the top of tape cartridge 142. During extraction of tape cartridge 142 in the front of deep storage slot 130, retaining gate 160 which is being biased downward falls into a large notch 143 in tape cartridge 142 so that it is ready to "catch" or stop tape cartridge 141 in the deep storage slot 130 at the appropriate position.

Figure 11:
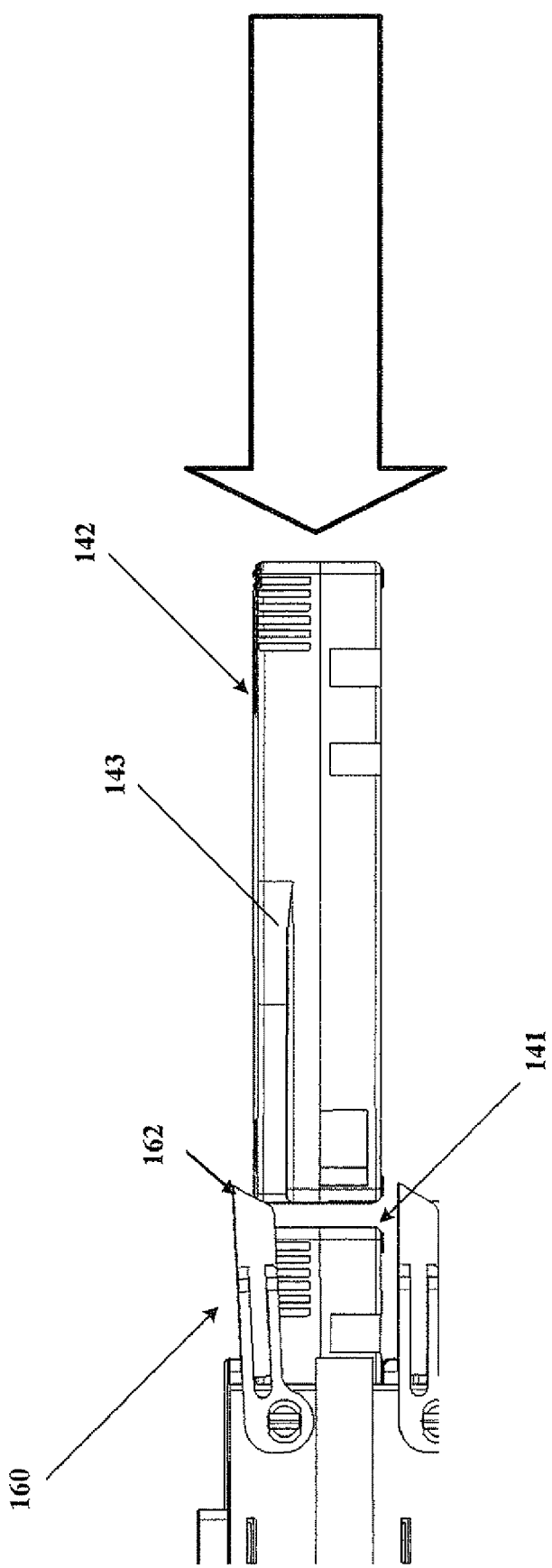
FIG. 11 illustrates a side view of an operation of the retaining gate illustrated in FIGS. 5 and 6 during an insertion by a cartridge accessor of a front tape cartridge through the front opening of a deep storage slot in accordance with the present invention.

Once tape cartridge 142 is extracted and tape cartridge 141 is retained from being pushed out of deep storage slot 130, retaining gate 160 has successfully completed its cartridge retrieval process. Now retaining gate 160 must demonstrate an ability to work for cartridge insertion into the deep storage slot 130. When cartridge accessor 150 begins to insert tape cartridge 142 back into deep storage slot 130, retaining gate 160 is lifted to its releasing position in order to allow tape cartridge 142 into deep storage slot 130. A beveled area 163 of retaining catch 160 interacts with a rear portion of tape cartridge 142 so that retaining gate lifts up to its releasing position due to tape cartridge 142 being pushed in by cartridge accessor 150 as shown in FIG. 11 (cartridge accessor 150 is not shown). In doing this operation, tape cartridge 141 already in deep storage slot 130 is pushed deeper into deep storage slot 130 by tape cartridge 142 being inserted by cartridge accessor 150. Upon full insertion into deep storage slot 130, the cartridge accessor 150 must drop down to disengage retaining gate 160 and then retract its accessor fingers 151 for completion of tape cartridge 142 insertion.

Figure 12:
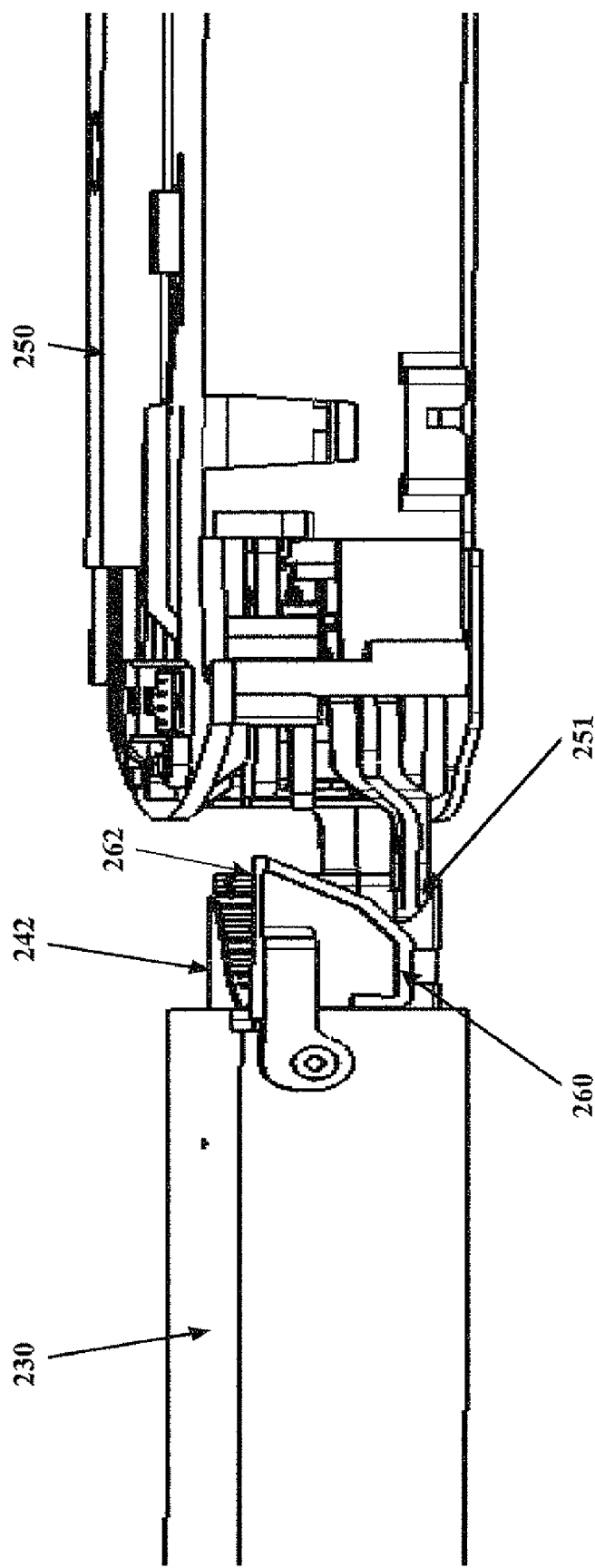
FIGS. 12 and 13 illustrate perspective views of a second exemplary embodiment of the retaining gate illustrated in FIGS. 1-4 during a removal by a cartridge accessor of a front tape cartridge through the front opening of a deep storage slot in accordance with the present invention.
Figure 13:
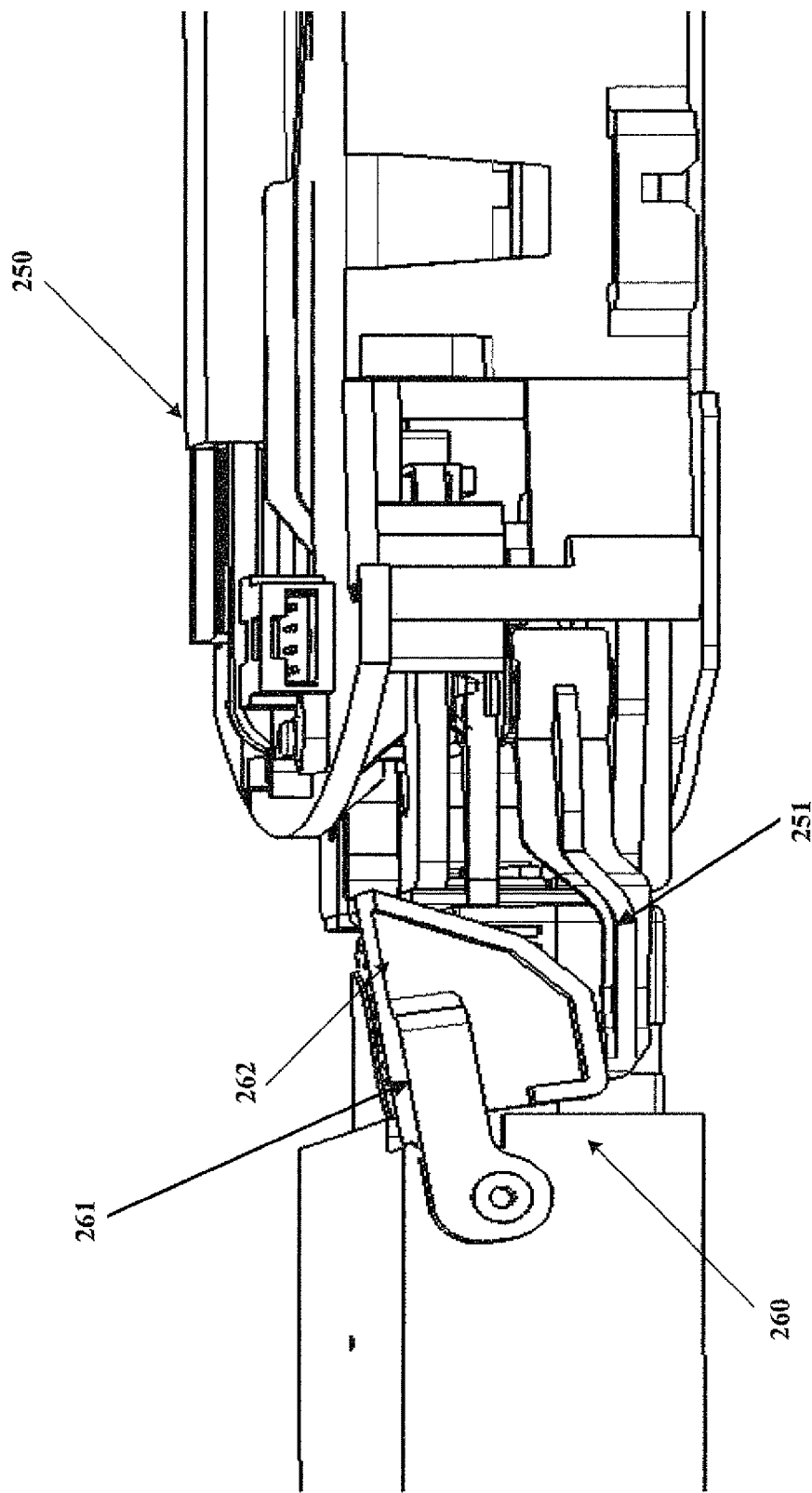

The above description of retaining gate 160 describes an embodiment which uses a cartridge accessor that lifts retaining gate 160 due to vertical motion of cartridge accessor. FIGS. 12 and 13 illustrate an alternative retaining gate 260 that can work with other types of cartridge accessors, such as a cartridge accessor 250 in the IBM 3584 tape library. Any interaction between retaining gate 260 and cartridge accessor 250 does not require vertical motion of cartridge accessor 250 to engage retaining gate 160. Instead accessor fingers 251 of cartridge accessor 250 are used to push a beveled surface of a catch 262 of retaining gate 260 up to is releasing position during a cartridge extraction by pure in and out motion. For cartridge insertion, the same beveled surface of catch 261 of retaining gate 260 is used to lift retaining gate 260 by tape cartridge 242 pushed by cartridge accessor 250. However, cartridge accessor 250 does not require a downward motion to disengage retaining gate 260 because accessor fingers 251 have opened up and are not interacting with retaining gate 260 on the insertion cycle.

From FIGS. 1-13, those having ordinary skill in the art will appreciate how to apply the inventive principles of the present invention to develop a storage cartridge retention device in any desired capacity for any type of storage cartridge (e.g., any type of tape cartridge). Those having ordinary skill in the art will further appreciate various benefits and advantages of the present invention including, but not limited to, a simple, highly reliable, low force retaining gate for retaining cartridges within a deep storage slot, particularly for an automated tape library.

Furthermore, those having ordinary skill in the art may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A storage cartridge retention device, comprising:
    a deep storage slot for storing at least one storage cartridge through a front opening of the deep storage slot and for biasing the at least one storage cartridge as stored in the deep storage slot in a direction of the front opening of the deep storage slot; and
    a retaining gate external to the deep storage slot and movable relative to the front opening of the deep storage slot between a retaining position and a releasing position,
    wherein the retaining position of the retaining gate engages a front storage cartridge of the at least one storage cartridge to retain the at least one storage cartridge within the deep storage slot based on the bias of the at least one storage cartridge as stored in the deep storage slot in the direction of the front opening of the deep storage slot,
    wherein the releasing position of the retaining gate disengages the front storage cartridge to facilitate movement of the at least one storage cartridge within the deep storage slot based on the bias of the at least one storage cartridge as stored in the deep storage slot in the direction of the front opening of the deep storage slot, and
    wherein each storage cartridge is a tape cartridge, and wherein the retaining gate includes a catch interfacing with the at least one of the front tape cartridge and a cartridge accessor based on a storage operation between the front tape cartridge and the cartridge accessor.

2. The storage cartridge retention device of claim 1, wherein
    the catch is configured to engage front tape cartridge in response to the retaining gate being in the retaining position and for disengaging the front tape cartridge in response to the retaining gate being in the releasing position.

3. The storage cartridge retention device of claim 1, further comprising:
    a pivoting post coupled to the deep storage slot, wherein the retaining gate is pivotal about the pivoting post between the retaining position and the releasing position.

4. The storage cartridge retention device of claim 3, wherein the retaining gate is biased toward the retaining position.

5. The storage cartridge retention device of claim 1, wherein the retaining gate further includes:
    a pivoting arm pivotally coupled to a pivoting post and integrated with the catch to pivot the retaining gate between the retaining position and the releasing position based on an interfacing of the catch with the at least one of the front tape cartridge and the cartridge accessor.

6. The storage cartridge retention device of claim 1, wherein the catch includes:
    a beveled surface serving as an interface of the retaining gate with the front tape cartridge during an insertion by a cartridge accessor of the front tape cartridge through the front opening into the deep storage slot.

7. The storage cartridge retention device of claim 1, wherein the catch includes:
    a beveled surface serving as an interface of the retaining gate with a cartridge accessor during an insertion by the cartridge accessor of the front tape cartridge through the front opening into the deep storage slot.

8. The storage cartridge retention device of claim 1, wherein the catch includes:
    a beveled surface serving as an interface of the retaining gate with a cartridge accessor during a removal by the cartridge accessor of the front tape cartridge from the deep storage slot.

9. A system, comprising:
    a deep storage slot for storing at least one storage cartridge through a front opening of the deep storage slot and for biasing the at least one storage cartridge as stored in the deep storage slot in a direction of the front opening of the deep storage slot;

a retaining gate external to the deep storage slot and movable relative to the front opening of the deep storage slot between a retaining position and a releasing position,
  wherein the retaining position of the retaining gate engages a front storage cartridge of the at least one storage cartridge to retain the at least one storage cartridge within the deep storage slot based on the bias of the at least one storage cartridge as stored in the deep storage slot in the direction of the front opening of the deep storage slot, and
  wherein the releasing position of the retaining gate disengages the front storage cartridge to facilitate movement of the at least one storage cartridge within the deep storage slot based on the bias of the at least one storage cartridge as stored in the deep storage slot in the direction of the front opening of the deep storage slot; and
a cartridge accessor for controlling the movement of the retaining gate between the retaining position and the releasing position based on a storage operation between the cartridge accessor and the front tape cartridge, wherein each storage cartridge is a tape cartridge, and wherein the retaining gate includes a catch interfacing with the at least one of the front tape cartridge and a cartridge accessor based on a storage operation between the front tape cartridge and the cartridge accessor.

10. The system of claim 9, wherein
the catch is configured to engage the front tape cartridge in response to the retaining gate being in the retaining position and for disengaging the front tape cartridge in response to the retaining gate being in the releasing position.

11. The system of claim 9, further comprising:
a pivoting post coupled to the deep storage slot, wherein the retaining gate is pivotal about the pivoting post between the retaining position and the releasing position.

12. The system of claim 11, wherein the retaining gate is biased toward the retaining position.

13. The system of claim 9, wherein the retaining gate further includes:
  a pivoting arm pivotally coupled to a pivoting post and integrated with the catch to pivot the retaining gate between the retaining position and the releasing position based on an interfacing of the catch with the at least one of the front tape cartridge and the cartridge accessor.

14. The system of claim 9,
wherein the storage operation between the front tape cartridge and the cartridge accessor includes:
  an insertion by the cartridge accessor of the front tape cartridge through the front opening into the deep storage slot; and
wherein the catch includes:
  a beveled surface serving as an interface of the retaining gate with the front tape cartridge during the insertion by the cartridge accessor of the front tape cartridge through the front opening into the deep storage slot.

15. The system of claim 9, wherein the storage operation between the front tape cartridge and the cartridge accessor includes:
  an insertion by the cartridge accessor of the front tape cartridge through the front opening into the deep storage slot; and
wherein the catch includes:
  a beveled surface serving as an interface of the retaining gate with the cartridge accessor during the insertion by the cartridge accessor of the front tape cartridge through the front opening into the deep storage slot.

16. The system of claim 9,
wherein the storage operation between the front tape cartridge and the cartridge accessor includes:
  a removal by the cartridge accessor of the front tape cartridge through the front opening from the deep storage slot; and
wherein the catch includes:
  a beveled surface serving as an interface of the retaining gate with the cartridge accessor during the removal by the cartridge accessor of the front tape cartridge through the front opening from the deep storage slot.

* * * * *